United States Patent [19]

Olon

[11] Patent Number: 4,904,905
[45] Date of Patent: Feb. 27, 1990

[54] DUAL RESONANT FREQUENCY ARC LAMP POWER SUPPLY

[75] Inventor: Thomas E. Olon, Fairview, Pa.
[73] Assignee: American Sterilizer Company, Erie, Pa.
[21] Appl. No.: 229,075
[22] Filed: Aug. 5, 1988
[51] Int. Cl.$^4$ .................................... H05B 41/36
[52] U.S. Cl. ............................ 315/244; 315/307; 315/DIG. 7
[58] Field of Search ............... 315/241 R, 242, 244, 315/307, 311, DIG. 7

[56] References Cited

U.S. PATENT DOCUMENTS

| | | | |
|---|---|---|---|
| 4,277,728 | 7/1981 | Stevens | 315/307 |
| 4,525,650 | 6/1985 | Hicks et al. | 315/226 |
| 4,698,554 | 10/1987 | Stupp et al. | 315/307 |
| 4,700,111 | 10/1987 | Folwell et al. | 315/200 R |
| 4,700,113 | 10/1987 | Stupp et al. | 315/224 |

OTHER PUBLICATIONS

Lester and Cohen, "The RF Starter and its Application to Miniature Metal Halide Lamps", Journal of the Illuminating Engineering Society (1986).

*Primary Examiner*—David Mis
*Attorney, Agent, or Firm*—Kirkpatrick & Lockhart

[57] ABSTRACT

An apparatus for starting and operating an arc lamp used in health care applications includes means for producing a rectangular wave AC signal with a frequency controlled by external resistive and capacitive networks. Parallel-connected inductor and capacitor means form a resonant circuit to receive the rectangular wave AC signal. Additional capacitor means connected in series with the arc lamp is closed into the circuit when the arc lamp begins to conduct, thereby changing the resonant frequency of the parallel inductor-capacitor resonant circuit. The detection of current flow in the arc lamp causes a resistor to be switched into the resistive network controlling the frequency of the pulse-width modulated signal, thereby changing the frequency of the rectangular wave AC signal.

1 Claim, 3 Drawing Sheets

DUAL RESONANT FREQUENCY ARC LAMP POWER SUPPLY

BACKGROUND OF THE INVENTION

1. Field of the Invention:

The present invention is directed generally to health care lighting fixtures and, more specifically, to a dual resonant frequency power supply for a surgical room arc lamp.

2. Description of the Prior Art:

Apparatus exist for starting and operating arc lamps used in a variety of applications. Because of the significantly different operating conditions exhibited by arc lamps between the start condition and the full run condition, present power supply apparatus for arc lamps incorporate a concept which involves combining separate devices for starting the lamp and operating the lamp in the full run condition. This concept involves providing a "starting" voltage signal of one magnitude and frequency for a predetermined period of time and then switching to a "running" voltage signal of another magnitude and frequency.

The concept used in these present apparatus exhibits significant drawbacks. The practice of combining two devices is excessively complex and does not provide for a smooth crossover from one operating condition to the other. In addition, the practice of providing "starting" condition voltages for a predetermined period of time and then switching to "running" condition voltages suffers from the drawback that the lamp is subject to the higher voltages for "starting" longer than is normally necessary. The result is that the life of the lamp is greatly reduced.

Accordingly, the need exists for a power supply device which can operate an arc lamp in both the "starting" and "running" conditions in a dependable and efficient manner. The apparatus of the present invention provides continuous current to the arc lamp and, therefore, does not require restart on each half-cycle as the alternating voltage passes through zero volts. The dual resonance frequency circuit of the present invention also provides a near-unity power factor during both lamp "starting" and "running" conditions resulting in minimum circuit power losses and the ability to use passive cooling means, smaller lower-cost power transformers and smaller packaging size. The automated frequency switchover from the "starting" to "running" condition eliminates arc lamp electrode degradation during virgin lamp starting or subsequent lamp starting by providing the appropriate power during the "starting" to "running" phase transitions. Furthermore, the apparatus of the present invention provides pure sinusoidal voltages at ultrasonic frequencies which nearly eliminates EMI, a practical requirement in health care applications.

SUMMARY OF THE INVENTION

The present invention is directed to an apparatus for starting and operating an arc lamp used in health care applications. The apparatus produces a rectangular wave AC signal with a frequency controlled by external resistive and capacitive networks. An inductor and capacitor connected in parallel form a resonant circuit to receive the rectangular wave AC signal. The series combination of an additional capacitor and the arc lamp is connected in parallel with the parallel inductor-capacitor combination. Means are provided for detecting current flow in the arc lamp and for producing a voltage signal proportional to the detected current flow. Switching means responsive to the current flow detection means function to switch a resistor into the resistive network controlling the frequency of the pulse-width modulated signal.

The apparatus of the present invention provides a power supply for an arc lamp used in health care applications which meets all of the requirements particular to this application such as low EMI and adaptability to 24 volt DC power sources. These and other advantages and benefits of the present invention will become apparent from a description of a preferred embodiment hereinbelow.

BRIEF DESCRIPTION OF THE DRAWINGS

In order that the present invention may be clearly understood and readily practiced, preferred embodiments will now be described, by way of example only, with reference to the accompanying figures wherein.

DETAILED DESCRIPTION OF THE PREFERRED EMBODIMENT

Figure 1:
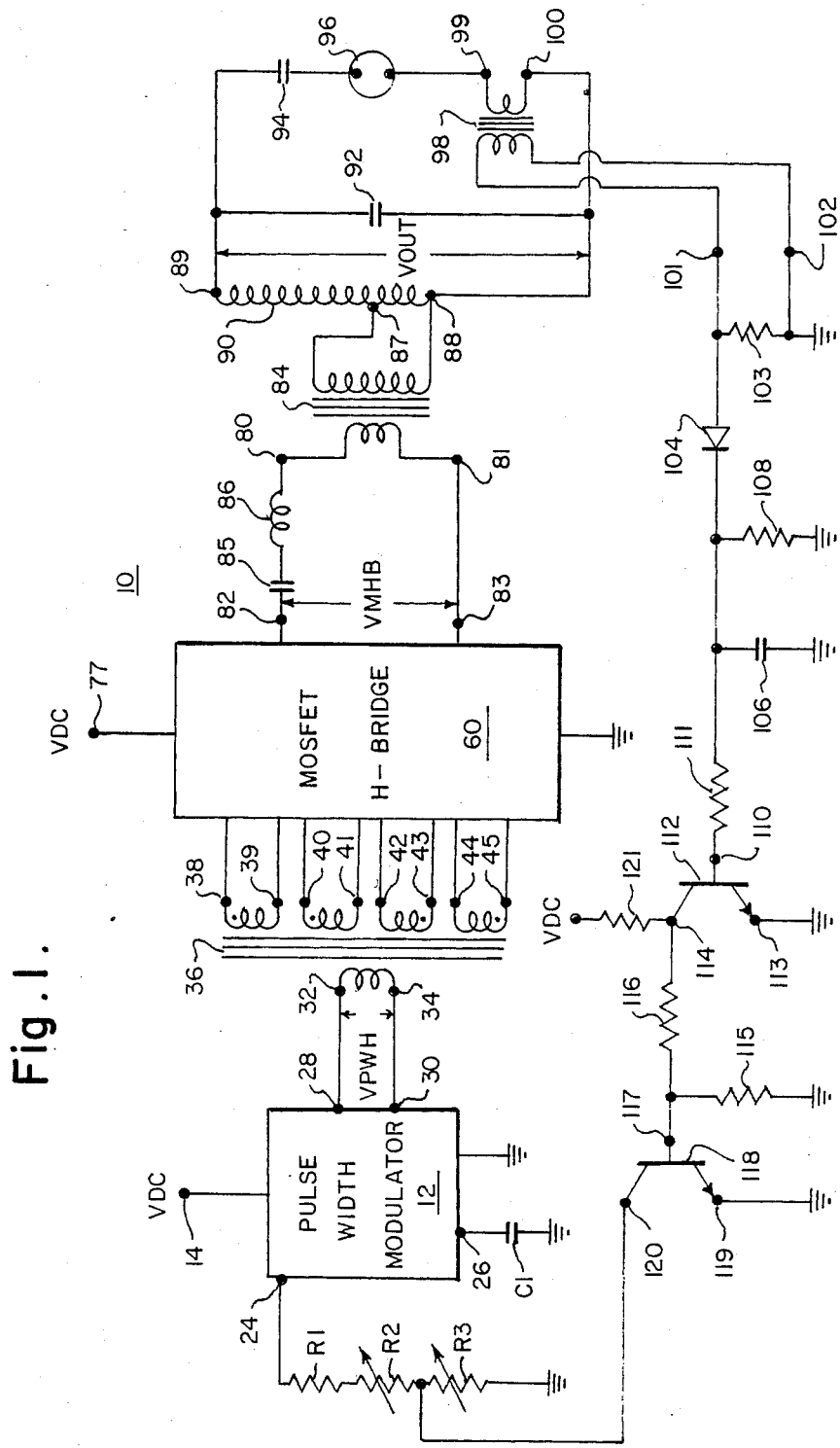
FIG. 1 illustrates a circuit constructed according to the teachings of the present invention for starting and operating an arc lamp.

FIG. 1 illustrates a circuit diagram for an apparatus 10 associated with a dual resonant frequency power supply of the present invention. Like reference numerals are employed among the various figures to designate like elements. A pulse width modulator 12 has an input terminal 14 adapted to be connected with a source of DC voltage of predetermined magnitude. One type of pulse width modulator 12 which may be used in the apparatus 10 of this invention is component SG2525AN available from Motorola Semiconductors. The DC voltage is supplied by an arrangement well known in the art such as that depicted in FIG. 3.

Figure 3:
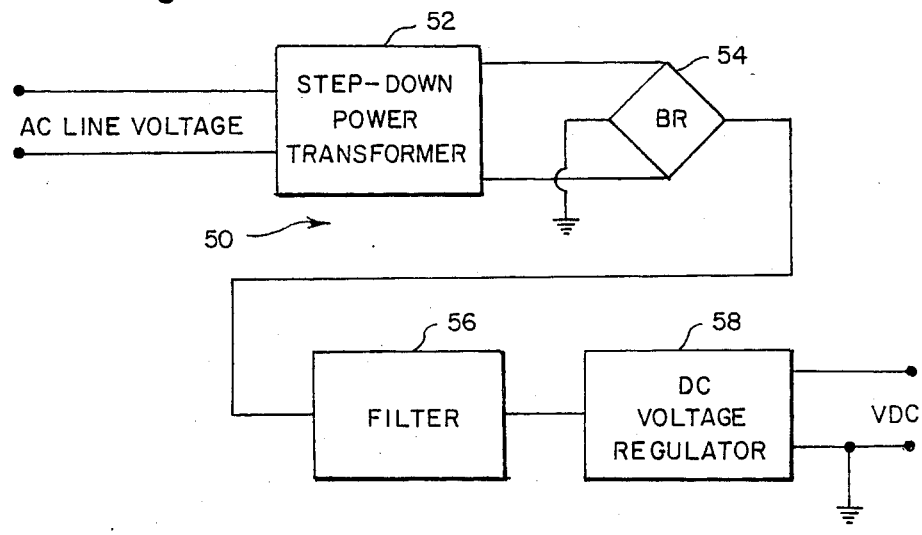
FIG. 3 illustrates a circuit constructed to transform an AC line voltage into a regulated DC voltage.

FIG. 3 illustrates a circuit 50 required for transforming an AC line voltage into a regulated DC voltage. The AC line voltage is applied across a primary winding of a step-down power transformer 52. A low voltage AC signal available across the terminals of a secondary winding of the transformer 52 is connected across opposite terminals of a bridge rectifier 54. The DC voltage at one of the remaining two terminals of the bridge rectifier 54 (with the fourth terminal being grounded) is filtered by filter 56 and then input to DC voltage regulator 58. DC voltages of preselected values are available at the output terminals of DC voltage regulator 58.

Returning to the description of the pulse width modulator 12 of FIG. 1, a resistive network consisting of frequency control resistors $R_1$, $R_2$ and $R_3$ is connected to terminal 24 of the pulse width modulator 12. Similarly, frequency control capacitor $C_1$ is connected to terminal 26. A voltage $V_{PWM}$ available across terminals 28 and 30 of pulse width modulator 12 is applied across the terminals 32 and 34 of the primary winding of driver transformer 36.

The driver transformer 36 may have approximately 25 turns on the primary winding and 25 turns on each of the four secondary windings and, therefore, may have a turns ratio of 1:1 with respect to each of the secondary windings. The outputs of transformer 36 available at secondary winding terminals 38, 39, 40, 41, 42, 43, 44 and 45 drive a H-Bridge 60 or its equivalent. Secondary winding terminals 38, 40, 43 and 45 have the same polarity.

Figure 2:
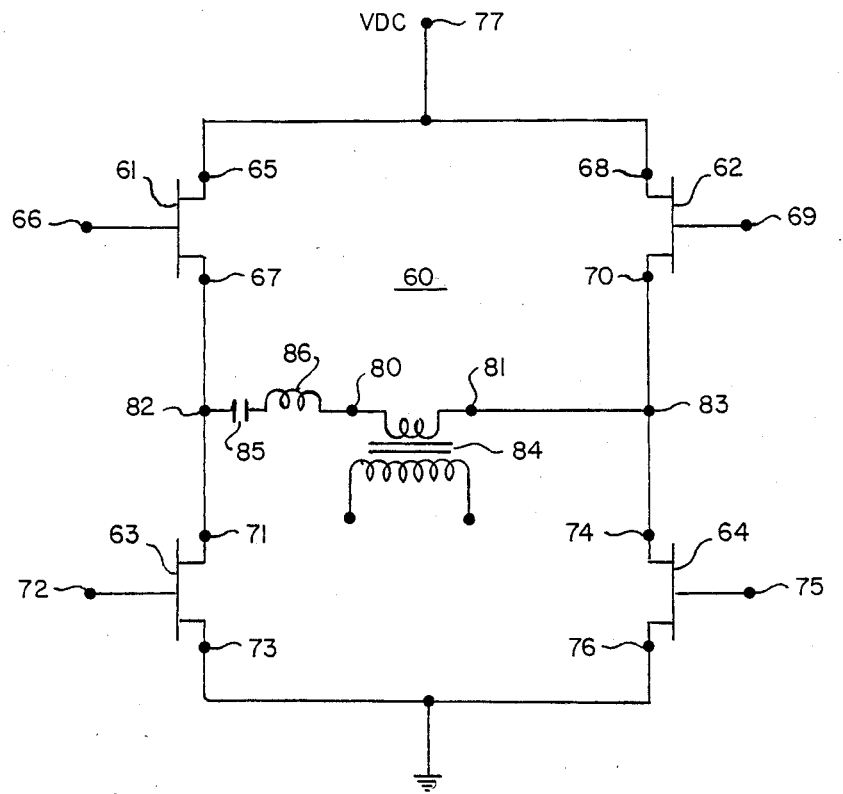
FIG. 2 illustrates the details of a power MOSFET H-Bridge shown in FIG. 1.

FIG. 2 illustrates additional details of a MOSFET H-Bridge 60 which may be used for the H-Bridge 60 of FIG. 1. The MOSFET H-Bridge 60 provides the high current driving capability which the pulse width modulator 12 does not possess. A DC voltage source of predetermined magnitude, available at terminal 77, is applied to terminals 65 and 68 of MOSFETs 61 and 62, respectively. One type of MOSFET which may be used in the apparatus 10 of the present invention is component MTM 50N05E available from Motorola Semiconductors. Terminals 65 and 68 are commonly known in the art as the "drain." Terminals 67 and 70 of MOSFETs 61 and 62, respectively, commonly known in the art as the "source," are connected to the drain terminals 71 and 74 of MOSFETs 63 and 64, respectively, at terminals 82 and 83. The source terminals 73 and 76 of MOSFETs 63 and 64, respectively, are connected to ground. Terminals 80 and 81 of the primary winding of a step-up transformer 84 are connected across terminals 82 and 83.

Transformer 36 terminal 38 is connected to MOSFET 61 terminal 66, commonly known in the art as the "gate," while transformer 36 terminal 39 is connected to source terminal 67. Similarly, transformer 36 terminals 40 and 41 are connected to MOSFET 64 gate and source terminals 75 and 76, respectively, transformer 36 terminals 42 and 43 are connected to MOSFET 62 gate and source terminals 69 and 70, respectively, and transformer 36 terminals 44 and 45 are connected to MOSFET 63 gate and source terminals 72 and 73, respectively. A voltage signal $V_{MHB}$ is available across terminals 82 and 83.

Capacitor 85 and inductor 86 of FIG. 1 together act as a band-pass filter, eliminating voltage frequencies both above and below those of concern, and are connected in series between terminals 82 and 80.

Step-up transformer 84 has a low-impedance primary winding and may have a turns ratio of approximately 1:3. The output terminals of the secondary winding are connected to the input low-turn tap 87 and the common tap 88 of tapped inductor 90. Tapped inductor 90 provides a step-up capability of approximately 1:20.

The output tap 89 and common tap 88 are shunted by capacitor 92. The parallel combination of tapped inductor 90 and capacitor 92 is further shunted by the series combination of capacitor 94, arc lamp 96 and current transformer 98. Arc lamp 96 is of the type which produces current flow by vaporizing one of the rare earth metals such as mercury, sodium or cesium. Voltage signal $V_{OUT}$ is available across the output tap 89 and common tap 88 of tapped inductor 90.

Current transformer 98 is connected by terminals 99 and 100 on its primary winding in series with capacitor 94 and arc lamp 96 and by terminals 101 and 102 on its secondary winding across resistor 103 to ground. Current transformer 98 may have a turns ratio of approximately 1:50.

The anode of diode 104 is connected to the secondary winding terminal 101 while the cathode is connected to one end of a parallel combination of a capacitor 106 and resistor 108, the other end of the parallel combination being tied to ground. The diode 104, capacitor 106 and resistor 108 combination performs the function of a half-wave rectifier and filter. One type of diode 104 which may be used in the apparatus 10 of this invention is component 1N914 available from Motorola Semiconductors.

The DC voltage at the output of the half-wave rectifier and filter is input to the base terminal 110 of transistor 112 through current limiting resistor 111. The emitter terminal 113 of transistor 112 is tied to ground while the collector terminal 114 is connected through load resistor 121 to a DC voltage source. Collector terminal 114 of transistor 112 is also connected through voltage divider resistors 115 and 116 to the base terminal 117 of transistor 118.

The emitter terminal 119 of transistor 118 is tied to ground while the collector terminal 120 is connected between resistors $R_2$ and $R_3$. One type of transistor which may be used for either transistor 112 or 118 is component 2N3904 available from Motorola Semiconductors.

The current transformer 98, transistor 118 and associated components act as a feedback path for detecting current flow through the arc lamp 96 which determines whether resistor $R_3$ is in or out of the circuit. Those of ordinary skill in the art will recognize that other combinations of components can be combined to provide an appropriate feedback path.

Figure 4A:
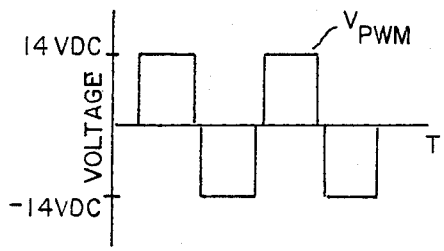
FIGS. 4A–4F illustrate various signals useful in explaining the operation of the circuit shown in FIG. 1.

In operation, transistor 118 is initially forward biased so that resistor $R_3$ is shorted to ground. The resistive network at terminal 24 of pulse width modulator 12, therefore, consists of resistors $R_1$ and $R_2$. Initially, the voltage $V_{PWM}$, available across terminals 28 and 30 of the pulse width modulator 12, can be represented by the signal of FIG. 4A. The signal frequency can be represented by the equation $$f = 1/(K(R_1 + R_2 + R_3) C_1)$$

where K is a constant. Since $R_3$ is initially shorted to ground, the equation becomes $$f = 1/(K(R_1 + R_2) C_1)$$

The signal magnitude is equal to the magnitude of the DC voltage applied at input terminal 14 of pulse width modulator 12.

Figure 4B:
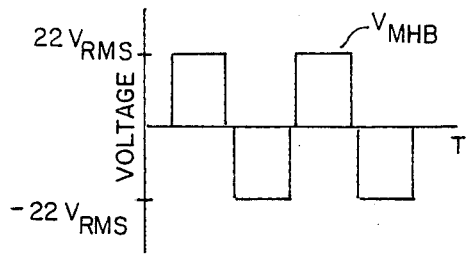

Voltage signal $V_{MHB}$ available across terminals 82 and 83 of MOSFET H-Bridge 60 can be represented by the trace of FIG. 4B. The frequency of voltage signal $V_{MHB}$ is equal to that of voltage signal $V_{PWM}$ while the magnitude of the signal is equal to the root-mean-square value of the DC input voltage available at terminal 77.

The operating characteristics of arc lamp 96 can be summarized by the following table:

| Arc Lamp Condition | Frequency | Impedance | Voltage Requirements | Current Requirements |
| --- | --- | --- | --- | --- |
| Start | 40–80 KHz | >100 MΩ | 3 $KV_{pp}$ | <10 μA |
| Glow | 40–80 KHz | 2–10 KΩ | 200 $V_{pp}$–3 $KV_{pp}$ | 10–100 mA |
| Run | 20–28 KHz | 10–100 Ω | 60 $V_{pp}$ | 1.7 A |

Figure 4C:
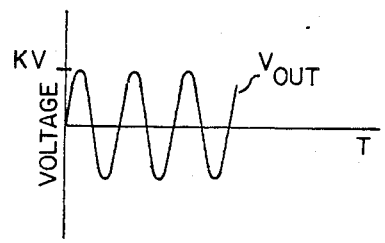

It can be seen from this data that at start conditions, the arc lamp 96 exhibits a very high impedance and functions to open the circuit of the series combination of capacitor 94, arc lamp 96 and current transformer 98. Tapped inductor 90 and capacitor 92, thus, form a parallel-resonant L-C circuit. The resonant frequency of this circuit can be represented by the following equation:

$$f_{resonant} = 1/(2\pi \sqrt{LC})$$

where L equals the inductance of tapped inductor 90 and C equals the capacitance of capacitor 92. The values of L and C are chosen for proper lamp operation, while $R_1$, $R_2$ and $C_1$ (inputs to pulse width modulator 12) are chosen such that the frequency of voltage signal $V_{PWM}$ at the output of pulse width modulator 12 is equal to the resonant frequency of the L-C Circuit. Voltage signal $V_{OUT}$ can be represented under lamp start conditions by the signal illustrated in FIG. 4C. $V_{OUT}$ has a frequency equal to both the resonant frequency of the L-C circuit and the frequency of voltage $V_{PWM}$ and a root-mean-square magnitude in the kilovolt range.

While arc lamp 96 is in the start condition and functions to open the circuit of the series combination, current transformer 98 senses no current. No voltage is produced across resistor 103 in this condition and the effect is to cause transistor 112 to be in cutoff such that the collector terminal 114 current equals zero. Transistor 118 then becomes forward-biased, the transistor conducts and the collector terminal 120 functions to short resistor $R_3$ to ground.

When arc lamp 96 proceeds through the glow condition and into the run condition, the impedance exhibited by it decreases significantly and current begins to flow through the arc lamp 96.

Current transformer 98 now senses the current flowing through arc lamp 96 and causes an AC voltage to be produced across resistor 103. The half-wave rectifier and filter combination of diode 104, capacitor 106 and resistor 108 transforms the AC voltage signal to a DC voltage signal proportional to arc lamp 96 current.

Transistor 112 now becomes forward biased, current begins to flow in collector terminal 114 and transistor 118 is in cutoff. The zero current flow in collector terminal 120 functions to place resistor $R_3$ into the resistive network coupled to terminal 24 of pulse width modulator 12.

Figure 4D:
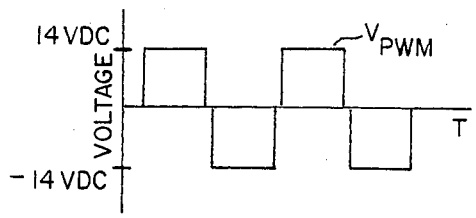

The voltage $V_{PWM}$ now available across terminals 28 and 30 of the pulse width modulator 12 can be represented by the signal of FIG. 4D. The signal frequency can now be represented by the equation $$f = 1/(K(R_1 + R_2 + R_3) C_1).$$

The signal magnitude is still equal to the magnitude of the DC voltage applied at input terminal 14 of pulse width modulator 12.

Figure 4E:
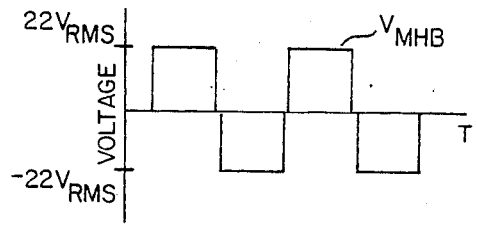

Voltage signal $V_{MHB}$ across terminals 82 and 83 of MOSFET H-Bridge 60 can now be represented by the trace of FIG. 4E. The frequency of voltage signal $V_{MHB}$ is equal to that of voltage signal $V_{PWM}$ while the magnitude of the signal is equal to the root-mean-square value of the DC input voltage available at terminal 77.

Figure 4F:
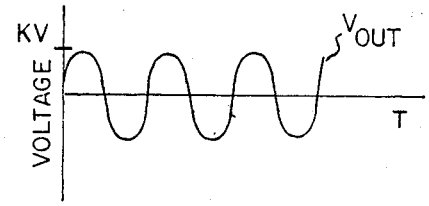

As current beings to flow through arc lamp 96, the series combination of capacitor 94, arc lamp 96 and current transformer 98 close into the L-C circuit, thereby altering the resonant frequency of that circuit. The new resonant frequency of this circuit can still be represented by the equation $$f_{resonant} = 1/(2\pi \sqrt{LC})$$

where L equals the inductance of tapped inductor 90 and where C now equals the summation of the capacitances of capacitors 92 and 94. Voltage signal $V_{OUT}$ can now be represented under lamp run conditions by the signal illustrated in FIG. 4F. $V_{OUT}$ now has a frequency equal to both the new resonant frequency of the L-C circuit combination and the new frequency of voltage $V_{PWM}$ and a root-mean-square magnitude in the kilovolt range approximately one-half that of the magnitude of $V_{OUT}$ under lamp start conditions.

While the present invention has been described in conjunction with an exemplary embodiment thereof, it will be understood that many modifications and variations will be readily apparent to those of ordinary skill in the art. This disclosure and the following claims are intended to cover all such modifications and variations.

I claim as my invention:

1. An apparatus for starting and operating an arc lamp used in health care applications, comprising:
    means for producing a signal suitable for driving the arc lamp, said signal having a frequency controlled by a resistive network;
    parallel-connected inductor means and capacitor means forming a resonant circuit to receive said signal;
    additional capacitor means connected in series with the arc lamp, the series combination of said additional capacitor means and the arc lamp being connected in parallel with said parallel-connected inductor means and capacitor means;
    means for detecting current flow in the arc lamp and producing a feedback signal in response to said detected current flow; and
    switching means responsive to said feedback signal for modifying said resistive network of said signal producing means.

* * * * *

UNITED STATES PATENT AND TRADEMARK OFFICE
CERTIFICATE OF CORRECTION

PATENT NO. : 4,904,905

DATED : February 27, 1990

INVENTOR(S) : Thomas E. Olon

It is certified that error appears in the above-identified patent and that said Letters Patent is hereby corrected as shown below:

Col. 6, line 10, delete "beings" and substitute therefor --begins--.

Signed and Sealed this

First Day of October, 1991

*Attest:*

HARRY F. MANBECK, JR.

*Attesting Officer*  *Commissioner of Patents and Trademarks*